(12) United States Patent
Serrecchia et al.

(10) Patent No.: US 10,422,297 B2
(45) Date of Patent: Sep. 24, 2019

(54) METHOD OF INJECTION MANAGEMENT IN AN INTERNAL COMBUSTION ENGINE

(71) Applicants: CONTINENTAL AUTOMOTIVE FRANCE, Toulouse (FR); CONTINENTAL AUTOMOTIVE GMBH, Hannover (DE)

(72) Inventors: Philippe Serrecchia, Villefranche de Lauragais (FR); Jean-Luc Fremaux, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 27 days.

(21) Appl. No.: 15/744,161

(22) PCT Filed: Jul. 14, 2016

(86) PCT No.: PCT/EP2016/001223
§ 371 (c)(1),
(2) Date: Jan. 12, 2018

(87) PCT Pub. No.: WO2017/012705
PCT Pub. Date: Jan. 26, 2017

(65) Prior Publication Data
US 2018/0202386 A1    Jul. 19, 2018

(30) Foreign Application Priority Data

Jul. 22, 2015 (FR) .................... 15 56928

(51) Int. Cl.
*F02D 41/40*    (2006.01)
*F02D 41/10*    (2006.01)
(Continued)

(52) U.S. Cl.
CPC ......... *F02D 41/402* (2013.01); *F02D 41/064* (2013.01); *F02D 41/107* (2013.01);
(Continued)

(58) Field of Classification Search
CPC .... F02D 41/402; F02D 41/064; F02D 41/107; F02D 41/1401; F02D 2041/1409; F02D 2200/021; F02D 2250/38; Y02T 10/44
(Continued)

(56) References Cited

U.S. PATENT DOCUMENTS 6,330,796 B1 * 12/2001 Nishimura ............ F02D 41/024
  60/286
6,345,499 B1 * 2/2002 Nishimura .............. F02D 37/02
  60/277

(Continued)

FOREIGN PATENT DOCUMENTS

DE    10 2013 219 701 B3    12/2014
EP     1 001 153 A1    5/2000
(Continued)

OTHER PUBLICATIONS

International Search Report, dated Aug. 26, 2016, from corresponding PCT application No. PCT/EP2016/001223.

*Primary Examiner* — Lindsay M Low
*Assistant Examiner* — John D Bailey
(74) *Attorney, Agent, or Firm* — Young & Thompson

(57) ABSTRACT

This method of injection management in a direct-injection engine involves shifting from a so-called single-injection mode (Init 1 pulse), in which the major portion of the quantity of fuel injected during a combustion cycle is injected in one go, to a so-called multi-injection mode (MPL active), in which several successive injections are carried out in order to inject fuel during a combustion cycle, and vice versa. The multi-injection mode is chosen when a condition (Continued)

based on one or more parameter(s) of the engine is fulfilled (MPL cdn ok). The multi-injection mode is limited to a predefined time interval (Tact_MPL_max) even if, at the end of the interval, the condition for adopting the multi-injection mode is still fulfilled.

12 Claims, 4 Drawing Sheets

(51) Int. Cl.
    *F02D 41/14*     (2006.01)
    *F02D 41/06*     (2006.01)

(52) U.S. Cl.
    CPC .. *F02D 41/1401* (2013.01); *F02D 2041/1409* (2013.01); *F02D 2200/021* (2013.01); *F02D 2250/38* (2013.01); *Y02T 10/44* (2013.01)

(58) Field of Classification Search
    USPC ........... 123/299, 300, 682, 438, 696, 339.21
    See application file for complete search history.

(56) References Cited

U.S. PATENT DOCUMENTS

| | | | | |
|---|---|---|---|---|
| 6,467,452 B1* | 10/2002 | Duffy | ................. | F02D 41/3035 |
| | | | | 123/295 |
| 6,557,532 B1* | 5/2003 | Nakayama | ............ | F02B 17/005 |
| | | | | 123/299 |
| 6,705,277 B1* | 3/2004 | McGee | .................. | F02D 41/38 |
| | | | | 123/27 R |
| 7,848,871 B2* | 12/2010 | Onishi | ................ | F02D 41/1458 |
| | | | | 123/585 |
| 10,066,573 B2* | 9/2018 | Thomas | ................ | F02D 41/065 |
| 2007/0079798 A1* | 4/2007 | Siewert | ................. | F02D 41/402 |
| | | | | 123/299 |
| 2008/0022966 A1* | 1/2008 | Tamma | ................. | F02D 41/402 |
| | | | | 123/299 |
| 2008/0307772 A1* | 12/2008 | Kawamura | ............. | F01N 3/021 |
| | | | | 60/285 |
| 2009/0272363 A1* | 11/2009 | Yun | .......................... | F02B 1/12 |
| | | | | 123/295 |
| 2012/0065869 A1 | 3/2012 | Kim | | |
| 2012/0245827 A1* | 9/2012 | Glugla | ................ | F02D 41/3094 |
| | | | | 701/105 |
| 2013/0218441 A1* | 8/2013 | Thomas | ................ | F02D 41/065 |
| | | | | 701/105 |
| 2013/0296121 A1* | 11/2013 | Gibson | ................. | F02D 41/022 |
| | | | | 477/5 |
| 2014/0039780 A1 | 2/2014 | Berkemeier et al. | | |
| 2014/0172275 A1* | 6/2014 | Surnilla | ................ | F02D 41/062 |
| | | | | 701/104 |
| 2014/0297159 A1* | 10/2014 | Surnilla | .............. | F02D 41/3094 |
| | | | | 701/103 |
| 2016/0237943 A1 | 8/2016 | Zhang | | |
| 2016/0356228 A1* | 12/2016 | Liu | ....................... | F02D 41/064 |
| 2017/0107932 A1* | 4/2017 | Ochi | ..................... | F02D 41/402 |

FOREIGN PATENT DOCUMENTS

| | | |
|---|---|---|
| EP | 2339158 A2 | 6/2011 |
| FR | 2 942 270 A1 | 8/2010 |
| FR | 2 992 360 A1 | 12/2013 |
| GB | 2502283 A | 11/2013 |
| WO | 2012/001310 A1 | 1/2012 |

\* cited by examiner

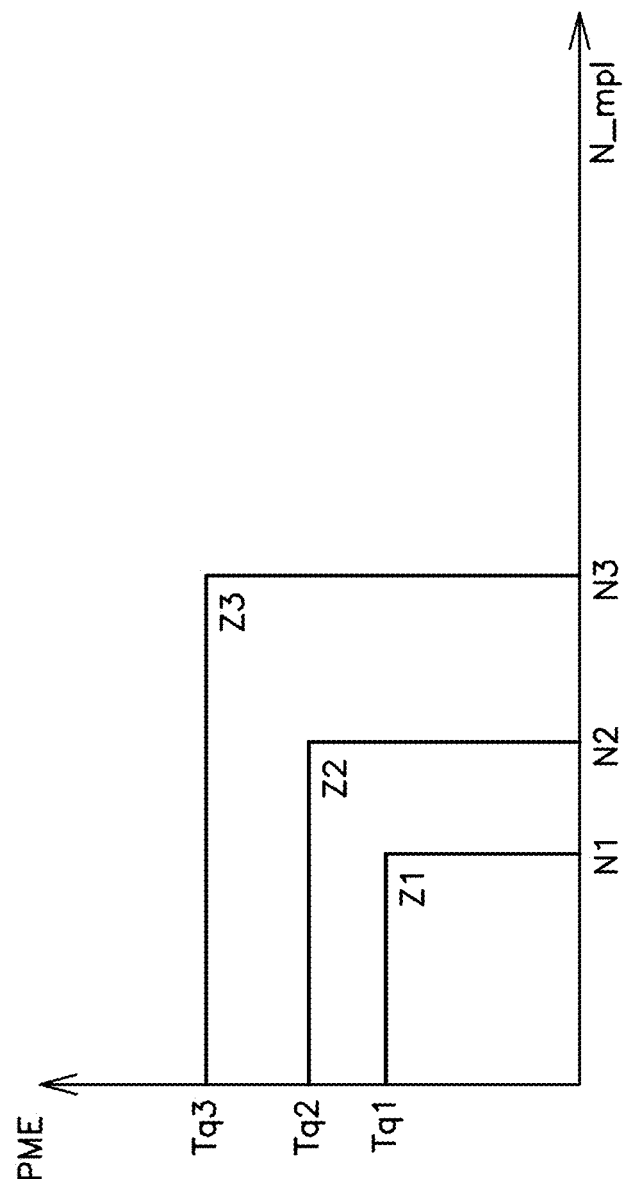

METHOD OF INJECTION MANAGEMENT IN AN INTERNAL COMBUSTION ENGINE

The present invention relates to a method of managing injection in an internal combustion engine.

BACKGROUND OF THE INVENTION

The field of the present invention is that of internal combustion engine control and management.

The problem underlying the present invention is that of limiting the emission of particles in the exhaust of an internal combustion engine. The standards in force are becoming increasingly strict and it is appropriate to further optimize engine management in order to limit the amount of particulates emitted by an engine.

The present invention is more particularly concerned with engines referred to as direct injection engines, which means to say engines comprising at least one combustion chamber into which fuel is injected directly (as opposed to engines in which a mixture of air and fuel formed upstream of the combustion chamber is introduced into the latter).

An injection system is controlled by an electronic unit. The engine operates according to a predetermined cycle and, for each cycle, a quantity (possibly zero) of fuel is determined by the electronic unit according to predefined parameters. The quantity of fuel thus defined is injected into the combustion chamber (we are considering the case of direct injection) in each cycle. Of course, it is important to inject the fuel at the correct moment during the cycle. It has also been noticed that under certain conditions, it is preferable to inject the fuel not in a single shot but in several.

Thus, the engine electronic control and management unit determines, in addition to the quantity to inject and the moment at which the injection is to be performed, whether to form a "single-shot" or a "multi-shot" injection. The strategies known from the prior art for switching from a single-shot injection regime to a multi-shot injection regime or vice versa are dependent on parameters such as the engine speed and/or the engine temperature (which corresponds to the temperature of the coolant) and/or to the engine load, etc.

The novel idea underlying the invention is that of believing that modifying the strategy governing the changeover between single-shot and multi-shot injection regimes may make it possible to limit the quantities of particulates emitted at the engine outlet.

It is therefore an object of the present invention to provide a novel strategy for managing injection in an engine that makes it possible to further limit the amount of particulates emitted by an engine.

As is known to those skilled in the art, it is when an engine is cold that it emits the most particulates. The invention therefore notably seeks to improve the fuel injection strategy in a direct injection engine when the engine is cold.

SUMMARY OF THE INVENTION

To this end, the present invention proposes a method for managing injection in a direct injection engine, in which method provision is made to pass from what is referred to as a single-shot injection regime in which the quantity of fuel injected during the combustion cycle is injected in a single shot to what is referred to as a multi-shot injection regime in which several successive shots are injected in order to inject the fuel during a combustion cycle, and vice versa, and in which the multi-shot injection regime is chosen when a condition based on one or more engine parameter(s) is met.

According to the present invention, the management method plans for the multi-shot injection regime to be limited to a predetermined time interval even if, at the end of this interval, the condition for adopting the multi-shot injection regime is still met.

The proposal here is thus to limit the time for which the injection of fuel is performed according to the multi-shot injection regime. It has been noticed that this approach makes it possible to optimize the level of particulate emissions during transient regimes, notably when the engine temperature is relatively low.

The parameters taken into consideration in determining whether or not a multi-shot injection regime is conceivable will for example be the parameters known from the prior art, usually engine speed, engine temperature and required torque. However, certain parameters may be omitted and/or other parameters may be used in addition to and/or in place of the parameters usually used for determining the possibility of switching to a multi-shot injection regime.

In order to optimize this engine injection management method still further, the length of the time interval is advantageously defined as a function of engine parameters. These may be either parameters already used for determining the regime (single-shot or multi-shot injection) to be employed and/or other parameters. For example, the duration of the multi-shot injection regime is determined as a function of parameters connected with temperatures inside the engine and, more particularly, the temperature of at least one piston and the temperature of the engine.

In order to adapt to the engine operating point even better, it is proposed for example that several multi-shot injection regimes be defined, according to whether the quantity of fuel is injected in two or three successive shots. The two-shot or three-shot multi-shot injection regime may be determined, for example, as a function on the one hand of the engine speed and, on the other hand, of the engine load.

It has been found that it was preferable, from a level of particulate emissions standpoint, to return to the multi-shot injection regime when high increases in load were required. Thus, the method for managing injection in an engine advantageously anticipates, after switching to single-shot injection regime, planning to switch to multi-shot injection regime if the condition is met and if also a load gradient exceeds a predetermined value.

The present invention also relates to:
- an electronic unit for managing injection in a direct injection engine, characterized in that it comprises means for carrying out each of the steps of a method as described hereinabove;
- a system for managing an internal combustion engine, characterized in that it comprises an electronic unit as defined in the previous point, and
- an internal combustion engine, characterized in that it comprises an electronic unit as defined two points earlier and/or a management system defined in the previous point.

BRIEF DESCRIPTION OF THE DRAWINGS

Details and advantages of the present invention will become more clearly apparent from reading the description that follows, presented with reference to the appended schematic drawing in which:

FIG. 3 is a graph illustrating various zones that can be used in the methods corresponding to FIGS. 1 and 2.

DETAILED DESCRIPTION OF THE PREFERRED EMBODIMENTS

The following description relates to the injection of fuel in a direct injection engine. An engine conventionally comprises an engine block in which bores are created to form cylinders inside each of which a piston moves. The engine block is closed by a cylinder head and the walls of the cylinder, the cylinder head and the piston then in each instance define a combustion chamber in which a mixture of air and fuel is burnt to release energy which is transmitted to the piston. In modern engines, air is introduced into the combustion chamber and fuel is injected directly into, and mixed with the air in, the chamber according to the instant (defined as a function of the position of the piston) at which combustion is to take place. These engines are referred to as direct injection engines.

The injection of fuel into the combustion chamber can be achieved in various ways. Prior to the injection of the fuel, a quantity of fuel to be injected and a moment (angle) of injection are determined. Whether the quantity of fuel is to be injected in a single shot or rather in several shots is also determined. In the former instance, the remainder of the description will refer to a single-shot injection regime, and in the latter instance, to a multi-shot injection regime.

During engine development, conditions under which it is preferable to have a single-shot injection regime and conditions under which it is preferable to have a multi-shot injection regime are determined. The multi-shot injection regime is generally chosen when the engine is cold, shortly after starting. Usually, for the multi-shot injection regime to be selected, there are certain parameters that need simultaneously to be comprised within a certain range.

Figure 1:
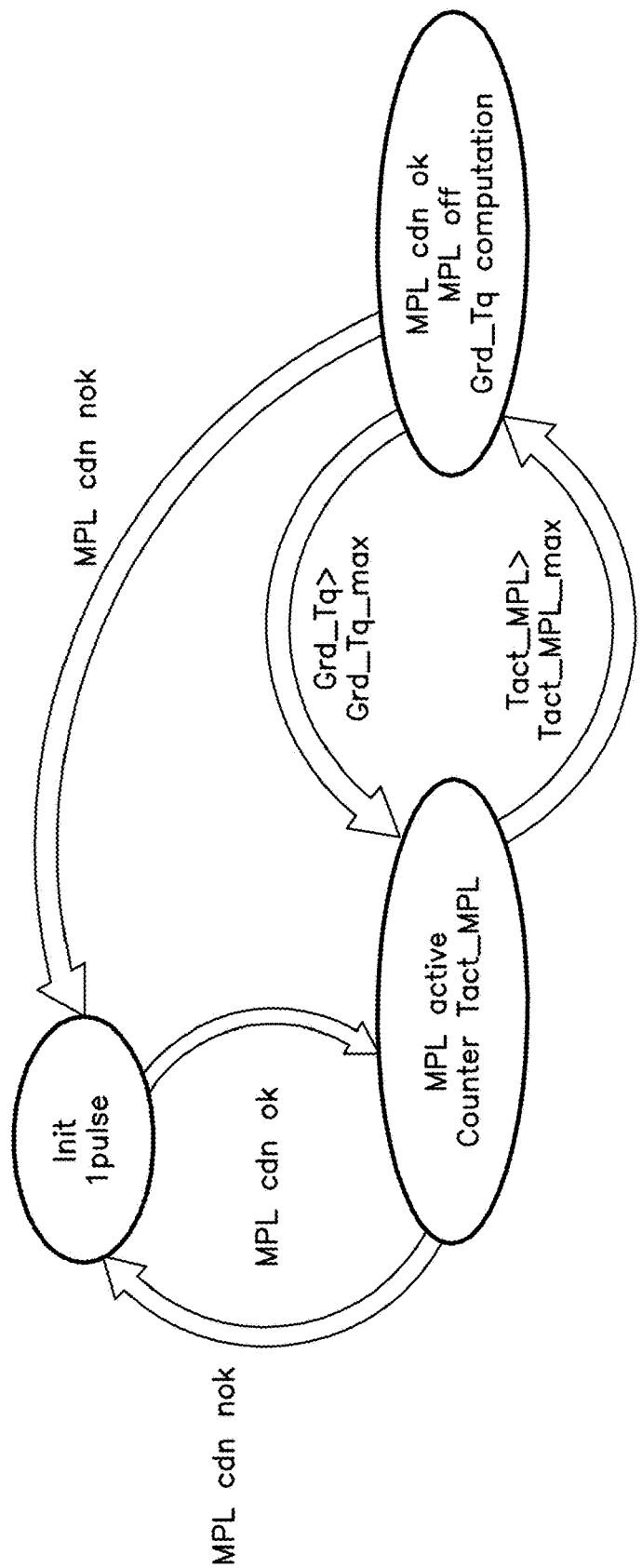
FIG. 1 is a schematic view, illustrating the principle of an injection method according to the present invention.
Figure 2:
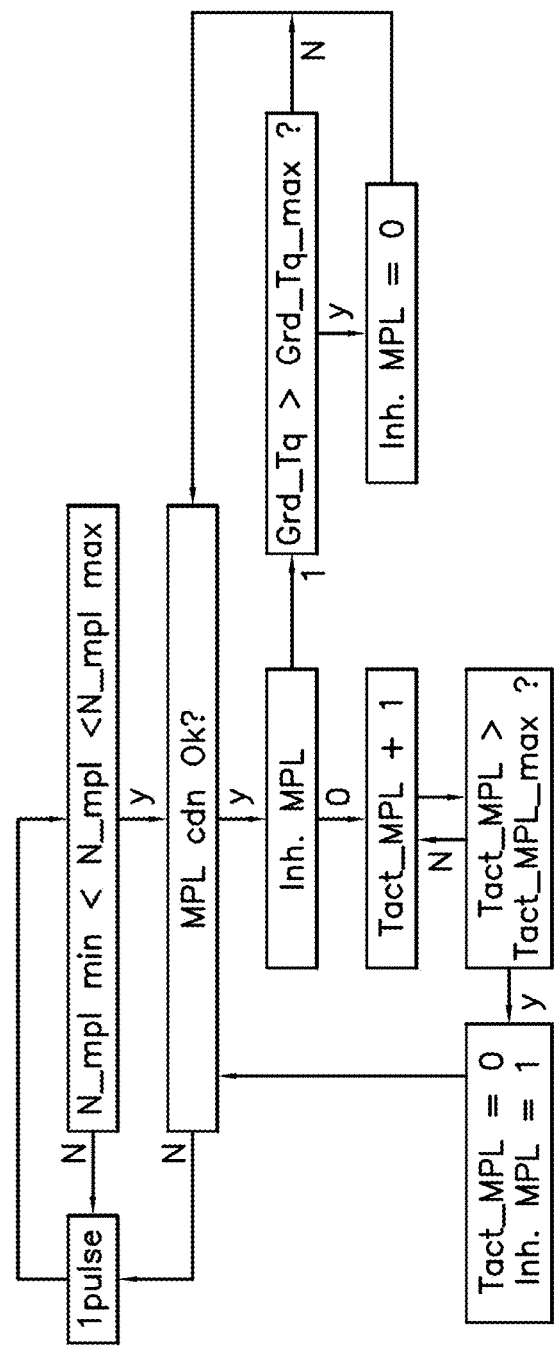
FIG. 2 presents an injection method in the form of a flowchart.

In FIGS. 1 and 2 the conditions to be met for the multi-shot injection regime to be able to be implemented are referred to as "MPL cdn". The parameters chosen for implementing the multi-shot injection regime may vary from one engine to another.

Clearly by way of nonlimiting illustration, it will be assumed for example that the conditions MPL cdn are met when simultaneously the engine speed N is below a predetermined value Nmax and above a value Nmin, the engine temperature is below a temperature Θmax, and the mean effective pressure (PME) is below a value PMEmax.

Other parameters, for example the oil temperature, the flowrate of air entering the engine, etc. may be used in place of and/or in addition to the parameters mentioned in the preceding paragraph to define the conditions MPL cdn.

Whereas in the prior art as long as the predetermined conditions MPL cdn were met the regime was a multi-shot injection regime, provision is made here for implementation of this operating regime to be limited in time.

On start-up, by default, the single-shot injection regime is intended (corresponding to the phase "Init" in FIG. 1). If the conditions MPL cdn are met (MPL cdn ok) then the multi-shot injection mode (MPL) is activated. From the time that this MPL (multi-shot injection) operating regime is actuated, a timer (compteur Tact_MPL) is started.

When the multi-shot injection mode is active (MPL active), an engine control and management system continues to check that the conditions MPL cdn are still met. If, before the timer (compteur Tact_MPL) runs out, the conditions MPL cdn become no longer met, then the injection regime reverts to the single-shot (1pulse) regime.

The control and management system also checks on the timer compteur Tact_MPL. When the value of Tact_MPL exceeds a value Tact_MPL_max, then the injection system switches to a single-shot injection mode referred to as MPL off. A distinction is made here between the single-shot injection regime when the conditions MPL cdn are met (referred to as MPL off mode which is novel and does not exist in the prior art) and the single-shot injection regime when the conditions MPL cdn are not met (referred to as 1 pulse).

In the MPL off mode, in an preferred alternative form of embodiment of the invention, the control and management system checks on the torque gradient demanded by the driver. This gradient, referred to as Grd_Tq in the figures, corresponds to the variation in load demanded of the engine by the driver. It may of course be positive (increase in load) or negative (decrease in load). This torque value is, as known by those skilled in the art, connected to the PME value mentioned above. When a significant increase in load is demanded (high acceleration required, significant hill, etc.), it is preferable, if the MPL cnd conditions are still met, to switch to multi-shot injection regime. Thus, from the MPL off mode, if the torque gradient is above a value Grd_Tq_max, the multi-shot injection regime becomes active again (MPL active). The timer compteur Tact_MPL is then activated again.

When, from the MPL off mode, the conditions MPL cdn are no longer met (MPL cdn nok), the regime of the injection system reverts to the initial single-shot injection regime (Init 1pulse).

In a preferred alternative form of embodiment, provision is made for the maximum activation time (Tact_MPL_max) to be parameterized. The parameters chosen are, for example, the temperature of the engine pistons and the engine temperature.

The temperature of the piston is an estimated temperature. There is not in theory any sensor for determining this temperature. Document FR 2 942 270 provides a method for determining the temperature of a piston which can be used here.

The engine temperature here is the same as the engine temperature used to determine whether the conditions MPL cdn are met. This is the temperature of the engine coolant. This temperature is measured by at least one sensor. This is an important parameter in modern engine management.

FIG. 2 is a flowchart that can be used for programming the method illustrated in FIG. 1.

Compared with FIG. 1, a number of new variable names have been introduced. The engine speed for example is referred to as N_mpl. The multi-shot injection regime may be chosen when the value of N_mpl is comprised between the extreme values N_mpl min and N_mpl max. A binary value lnh. MPL has also been introduced. This allows a distinction to be made between the "Init 1pulse" mode and the "MPL off" mode of FIG. 1. When lnh. MPL is equal to 0, then the current mode corresponds to Init 1pulse of FIG. 1 whereas if lnh. MPL is equal to 1, then the current mode is the MPL off mode.

There would appear to be no need to describe all the operations of the flowchart which are clearly obvious to a person skilled in the art. The latter will appreciate that in this flowchart N corresponds to No, whereas Y corresponds to Yes.

FIG. 3 illustrates another alternative form of embodiment of an injection management method. Here, several multi-shot injection regimes are proposed.

FIG. 3 is a graph with an abscissa axis corresponding to the engine speed N_mpl and an ordinate axis corresponding to the mean effective pressure (PME). Three zones Z1, Z2 and Z3 are illustrated on this graph.

The first zone Z1 corresponds to a speed below a value N1 and to a mean effective pressure corresponding to a torque lower than Tq1. The zone Z2 corresponds to a speed below a value N2 and to a mean effective pressure corresponding to a torque lower than Tq2, but excluding the zone Z1. The zone Z3 is defined in the same way with the limit values N3 and Tq3.

When the injection system is operating in multi-shot injection regime, provision is made here to have two sub-regimes of operation. In a first sub-regime, the quantity of fuel determined for each injection is injected in two shots into the combustion chambers, and according to the second sub-regime, said quantity of fuel is injected in three shots. The sub-regime is applied according to the graph of FIG. 3. It is assumed here that the engine temperature is substantially constant because it varies far less rapidly than the engine speed and/or the mean effective pressure. Several graphs such as that of FIG. 3 are established for different engine temperatures.

When the multi-shot injection regime is then active, depending on the load applied to the engine and depending on the rotational speed of the engine, the injections of fuel may be made in two or three shots, depending on the position of the operating point on the graph of FIG. 3. If the operating point falls in zone Z1, the injection regime becomes the single-shot injection regime.

The injection method and the alternative forms of embodiment thereof have been carried out on testbed and the tests carried out have made it possible to verify that implementing such a method makes it possible to appreciably reduce the number of particulates emitted by an engine.

Transient phases in the operation of an engine have been analyzed on testbed. Tests have been carried out alternating single-shot injection regimes with multi-shot injection regimes, while keeping the engine speed constant. In order to cool the engine, an external cooling system was used to cool the coolant. In order to cool the inside of the combustion chambers and therefore also the pistons, the engine was driven in rotation by the testbed without injecting fuel. In that way, the ambient air entering the combustion chambers cooled these and the corresponding pistons.

During testing, it was found that there was a particulate emissions spike at the start of injection followed by an asymptotic reduction in the level of particulate emissions emitted. It is therefore beneficial to analyze the emissions spike and to attempt to reduce this as far as possible. It is then appropriate to limit as far as possible the asymptotic value towards which the level of particulate emissions tends. Finally, for preference, the integral of the level of emissions both in the zone exhibiting an emissions spike and in the zone in which the emissions level becomes substantially constant needs to be as low as possible in order to limit the overall level of particulate emissions.

The tests carried out clearly show that the injection method described hereinabove makes it possible to appreciably reduce the amount of particulates emitted throughout a transient regime.

The tests carried out can be used also to develop the engine and to determine, in a given engine, the conditions that determine whether or not to switch to a multi-shot injection regime.

Figure 4:
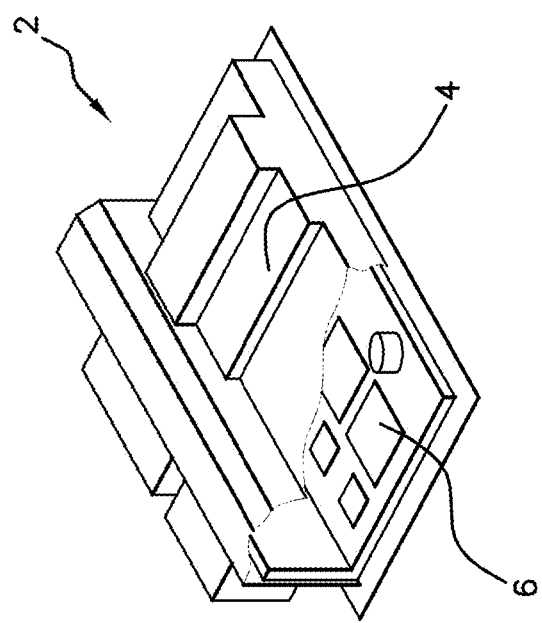
FIG. 4 is a schematic perspective view of an engine control unit that can be used for implementing the injection method.

FIG. 4 illustrates an electronic unit 2 comprising a housing 4 inside which there is an electronics board 6 comprising the electronics means for implementing each of the steps of an engine injection management method as described above.

Figure 5:
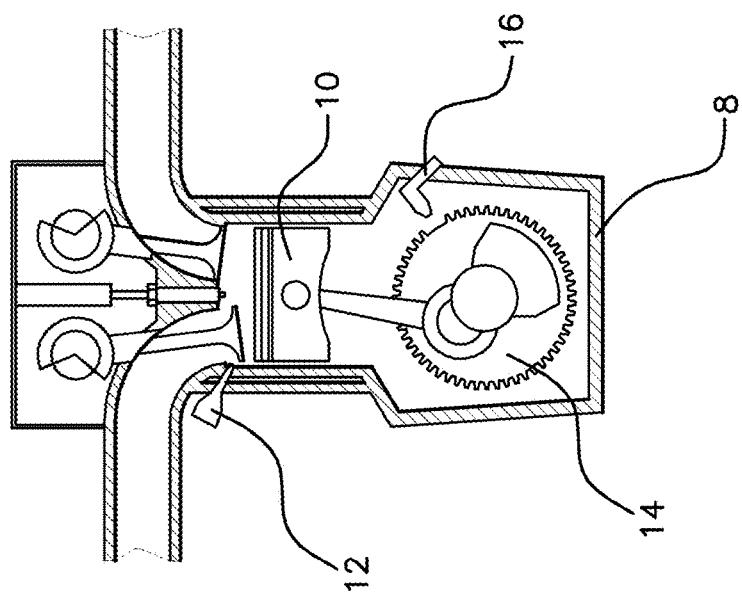
FIG. 5 is a schematic view of an engine equipped with an engine control unit illustrated in FIG. 4.

FIG. 5 for its part illustrates an engine that can be associated with the electronic unit 2 of FIG. 4. This figure shows an engine block 8 inside which are created cylinders in which pistons 10 (only one of which is illustrated here) slide. Above each of the pistons 10 there is a combustion chamber into which an injector 12, notably controlled by the electronic unit 2, injects fuel. The reciprocating movement of the pistons 10 is converted into a rotational movement transmitted to an engine flywheel 14. A sensor 16 associated with this engine flywheel 14 is used to determine the engine speed N.

Of course, the present invention is not restricted to the embodiment described and the alternative forms of embodiment mentioned, but also relates to any form of embodiment within the competence of a person skilled in the art within the scope of the claims which follow.

The invention claimed is:

1. A method for managing injection in a direct injection engine configured to change from operating in a single-shot injection regime, in which the quantity of fuel injected during a combustion cycle is injected in a single shot, to a multi-shot injection regime, in which a plurality of successive shots are injected in order to inject the fuel during a combustion cycle, and vice versa, comprising the steps of:
    changing an operation of the direct injection engine to that of the multi-shot injection regime when a condition based on one or more engine parameters is met; and
    changing the operation of the direct injection engine from that of the multi-shot injection regime to that of the single-shot injection regime upon expiration of a predetermined time interval, even if at the end of said predetermined time interval, said condition is still met,
    wherein a length of the predetermined time interval is defined as a function of the one or more engine parameters, the one or more engine parameters at least comprising temperatures inside the engine, said temperatures including a temperature of the engine and a temperature of at least one piston of the engine.

2. The engine injection management method as claimed in claim 1, wherein the multi-shot injection regime includes at least a first mode whereby the quantity of fuel is injected in two successive shots and a second mode whereby the quantity of fuel is injected in three successive shots.

3. The engine injection management method as claimed in claim 2, wherein an operating mode of the multi-shot injection regime in one of the first mode and the second mode is determined as a function of both the engine speed and engine load.

4. The engine injection management method as claimed in claim 1, further comprising:
    after switching said changing the operation of the direct injection engine from that of the multi-shot injection regime to that of the single-shot injection regime, changing the operation of the direct injection engine to that of the multi-shot injection regime if the condition is met and if also a load gradient exceeds a predetermined value.

5. An electronic unit for managing injection in a direct injection engine, comprising means for carrying out each of the steps of the method claimed in claim 1.

6. A system for managing an internal combustion engine, comprising an electronic unit as claimed in claim 5.

7. An internal combustion engine, comprising an electronic unit as claimed in claim 5.

8. The engine injection management method as claimed in claim 2, further comprising:
after said changing the operation of the direct injection engine from that of the multi-shot injection regime to that of the single-shot injection regime, changing the operation of the direct injection engine to that of the multi-shot injection regime if the condition is met and if also a load gradient exceeds a predetermined value.

9. The engine injection management method as claimed in claim 3, further comprising:
after said changing the operation of the direct injection engine from that of the multi-shot injection regime to that of the single-shot injection regime, changing the operation of the direct injection engine to that of the multi-shot injection regime if the condition is met and if also a load gradient exceeds a predetermined value.

10. A method for managing injection in a direct injection engine configured to change from operating in a single-shot injection regime, in which the quantity of fuel injected during a combustion cycle is injected in a single shot, to a multi-shot injection regime, in which a plurality of successive shots are injected in order to inject the fuel during a combustion cycle, and vice versa, comprising the steps of:
changing an operation of the direct injection engine to that of the multi-shot injection regime when a condition based on one or more engine parameters is met; and
changing the operation of the direct injection engine from that of the multi-shot injection regime to that of the single-shot injection regime upon expiration of a predetermined time interval, even if at the end of said predetermined time interval, said condition is still met,
wherein the multi-shot injection regime includes at least a first mode whereby the quantity of fuel is injected in two successive shots and a second mode whereby the quantity of fuel is injected in three successive shots.

11. The engine injection management method as claimed in claim 10, wherein an operating mode of the multi-shot injection regime in one of the first mode and the second mode is determined as a function of both the engine speed and engine load.

12. A method for managing injection in a direct injection engine configured to change from operating in a single-shot injection regime, in which the quantity of fuel injected during a combustion cycle is injected in a single shot, to a multi-shot injection regime, in which a plurality of successive shots are injected in order to inject the fuel during a combustion cycle, and vice versa, comprising the steps of:
changing an operation of the direct injection engine to that of the multi-shot injection regime when a condition based on one or more engine parameters is met;
changing the operation of the direct injection engine from that of the multi-shot injection regime to that of the single-shot injection regime upon expiration of a predetermined time interval, even if at the end of said predetermined time interval, said condition is still met; and
after said changing the operation of the direct injection engine from that of the multi-shot injection regime to that of the single-shot injection regime, changing the operation of the direct injection engine to that of the multi-shot injection regime if the condition is met and if also a load gradient exceeds a predetermined value.

\* \* \* \* \*